June 17, 1930.　　M. LOUGHEAD　　1,764,177
BRAKING APPARATUS FOR MOTOR VEHICLES
Original Filed Jan. 8, 1925　　3 Sheets-Sheet 1
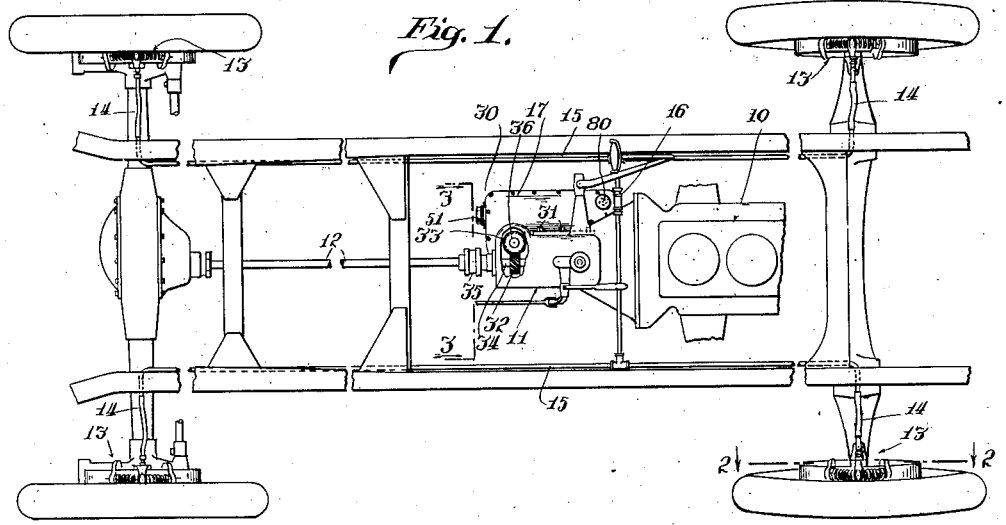
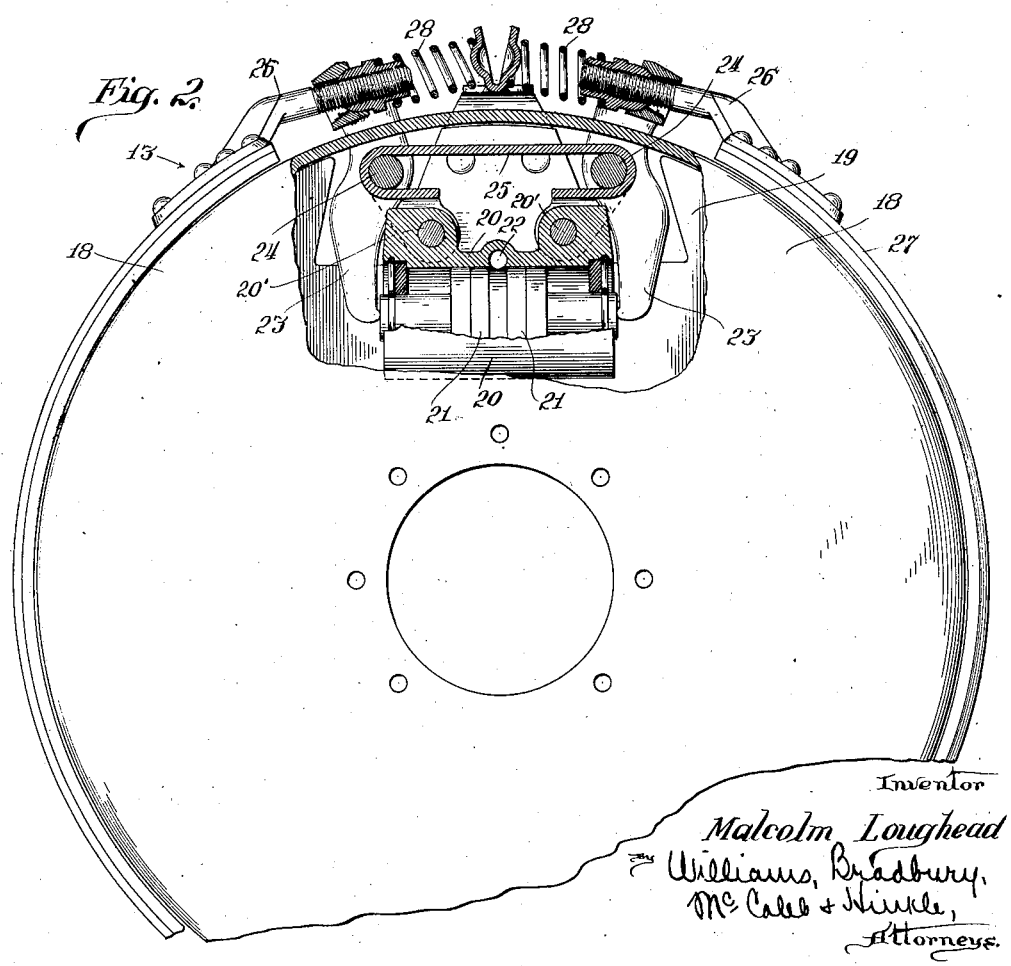
Inventor
Malcolm Loughead

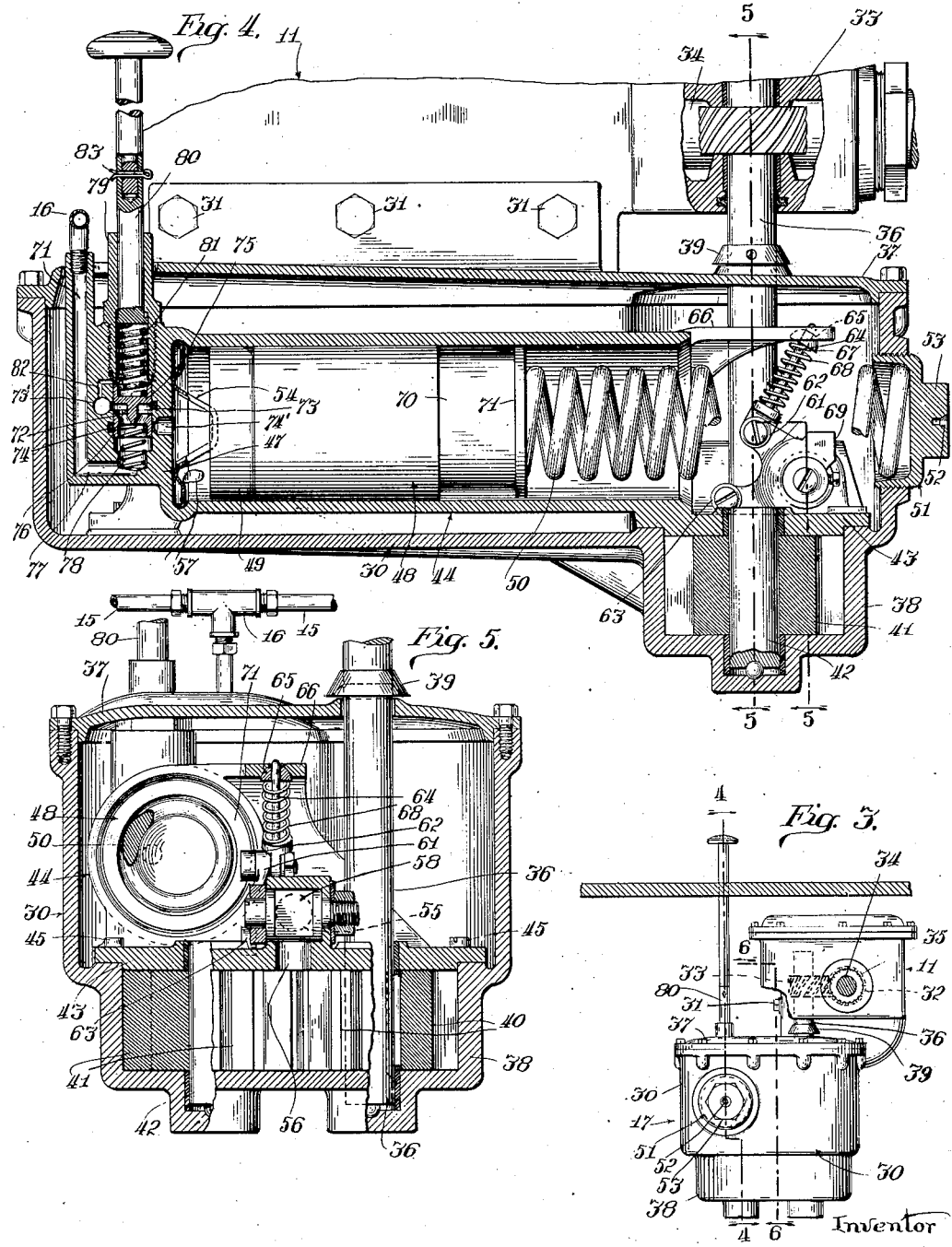

June 17, 1930.    M. LOUGHEAD    1,764,177
BRAKING APPARATUS FOR MOTOR VEHICLES
Original Filed Jan. 8, 1925    3 Sheets-Sheet 3
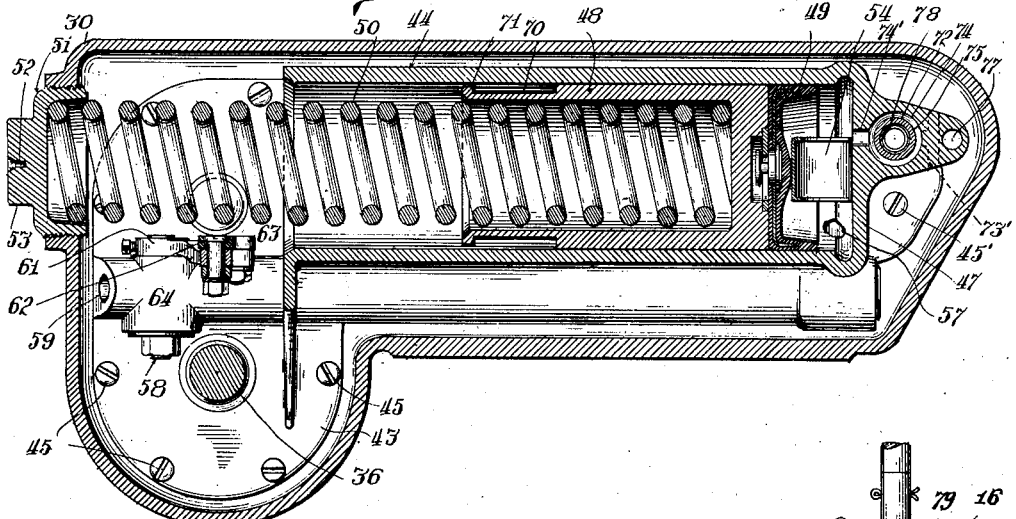
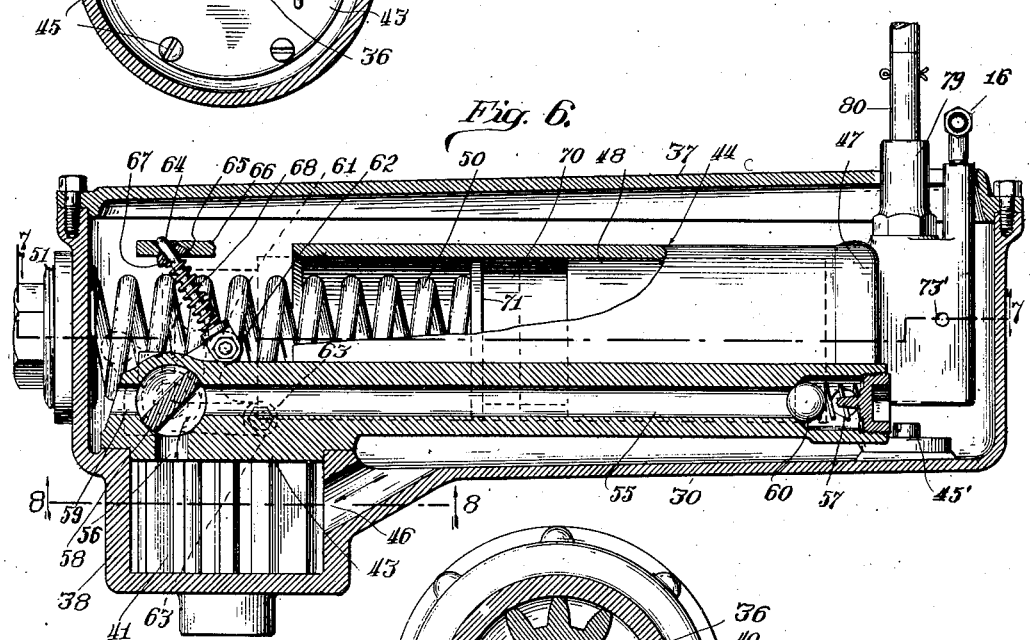
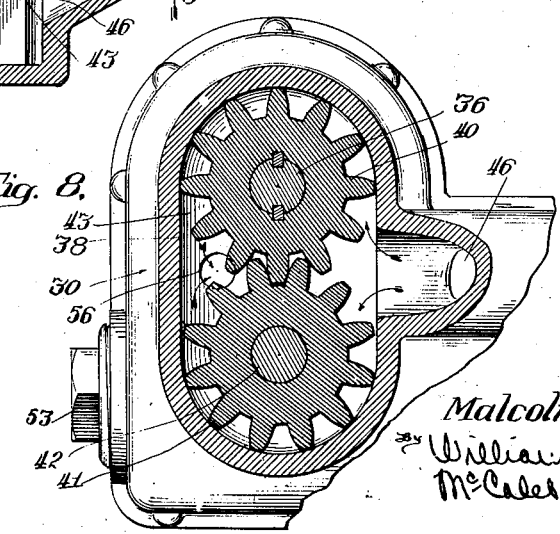
Inventor
Malcolm Loughead
By Williams, Bradbury,
McCaleb + Hinkle
Attorneys.

Patented June 17, 1930

1,764,177

UNITED STATES PATENT OFFICE

MALCOLM LOUGHEAD, OF DETROIT, MICHIGAN, ASSIGNOR TO HYDRAULIC BRAKE COMPANY, OF DETROIT, MICHIGAN, A CORPORATION OF CALIFORNIA

BRAKING APPARATUS FOR MOTOR VEHICLES

Application filed January 8, 1925, Serial No. 1,145. Renewed May 9, 1927.

My invention relates to braking apparatus for motor vehicles. Its principal object is the use of the driving power or momentum of the vehicle for furnishing the power to apply the brakes, thereby making a greater braking force available and relieving the driver of all but the mere control of the brakes. Another object is to maintain a reserve braking force that may be employed when the motor and vehicle are not in motion or are moving too slowly to generate sufficient braking power. I contemplate that when a gear pump or other pump is used to build up this reserve power, the pump will be relieved of its load when a predetermined reserve is built up.

A further feature of my invention is that when applied to hydraulic brakes, the liquid medium passed to the wheel brakes is also the medium for its reserve power. My apparatus is arranged particularly to avoid the loss of such liquid medium through the leaks often developed in high pressure tanks, gaskets, pipe fittings, and the like. This end is achieved in part by designing the apparatus with a view to eliminating as many as possible of such elements and in part by mounting the several elements within a casing which forms the reserve reservoir, so that whatever of liquid medium leaks out will go into the reservoir and not be lost from the system.

The foregoing and other objects and advantages of my invention will be set forth in detail in the following specification disclosing one particular embodiment of my invention which is illustrated in the accompanying drawings, wherein Figure 1 is a plan view of an automobile chassis showing the relation of my device to the other parts of the automobile;

Figure 2 is a side elevation broken partly into section showing the brake mechanism at the wheels which may be considered as being taken along the line 2—2 of Figure 1;

Figure 3 is a rear elevation of the usual transmission housing and also of the casing of my device showing its relation in connection therewith, which view may be considered as being taken on line 3—3 of Figure 1;

Figure 4 is a longitudinal vertical section taken on the line 4—4 of Figure 3;

Figure 5 is a transverse section taken on the line 5—5 of Figure 4;

Figure 6 is a longitudinal vertical section taken on the line 6—6 of Figure 3;

Figure 7 is a plan section taken on the line 7—7 of Figure 6, and

Figure 8 is a horizontal section taken on the line 8—8 of Figure 6 and looking upwardly.

Briefly described, my braking apparatus as disclosed in the drawings includes hydraulically actuated brakes on the wheels of the automobile supplied with a liquid medium under pressure from a central or main compressor. This compressor is operated by a gear pump driven not from the motor but from the drive shaft or transmission of the automobile. A reserve supply of liquid under heavy spring tension is automatically maintained in the compressor and the liquid under pressure passed from the reserve or directly from the gear pump is controlled by a pedal operated valve which automatically regulates the pressure in the brake line proportionately to the pressure the driver applies to the pedal.

In Figure 1 I have shown an automobile chassis having the usual engine 10, transmission housing 11, and drive shaft 12. Each of the four wheels is provided with a brake mechanism 13 for actuation by hydraulic pressure, the liquid medium being led to the several wheels by means of flexible hose 14 and tubing 15 connecting with a common passage through a T-fitting 16 on the compressor 17 of my invention.

The chassis construction and also the construction of the brake mechanism may be of any suitable type, for my invention is not concerned with their details but with the improved compressor 17. A preferred form of brake mechanism, however, is shown in Figure 2. Each wheel carries a brake drum 18, across the open face of which is mounted a stationary plate 19, fixed to the axle housing or steering knuckle as the case may be.

A brake cylinder 20 is fixed to the plate 19 by bolts 20' and disposed within the drum 18. The cylinder 20 carries a pair of oppositely moving pistons 21, the liquid medium being passed to the interior of the cylinder between the opposed pistons 21 by connecting the flexible hose 14 to communicate with a duct 22. The outer ends of the pistons bear against the lower ends of the levers 23 which are pivoted at 24 on a stamped steel bracket 25 extending from the cylinder 20. The upper ends of the levers 23 engage suitable nuts adjustably threaded on shanks 26 secured to the ends of the brake band 27. Compression springs 28 urge the ends of the brake bands apart and normally force the pistons inwardly to return the liquid medium to the main compressor 17. This type of brake mechanism is more fully disclosed in my co-pending application, Serial No. 680,292, filed December 13, 1923.

My main compressor 17 is housed within a casing 30 which is secured by bolts 31 to the left side of the transmission housing 11. The transmission housing 11 is extended rearwardly a little farther than is usual to house a pair of spiral gears 32 and 33, the first of which is keyed to the stub shaft 34 extending rearwardly from the transmission forwardly of the first universal joint 35, while the second gear is keyed to a vertical shaft 36. The spiral gears 32 and 33 are continually in mesh so that the vertical shaft 36 is rotated whenever the automobile is in motion.

The shaft 36 extends downwardly through the cover 37 of the casing 30 and to the bottom of a well 38 in the casing where the lower end of the shaft is journaled. An undercut conical throw-off ring 39 is preferably provided to prevent any of the transmission oil which lubricates the spiral gears from passing down the shaft into the casing 30 and being mixed with the liquid medium in the casing.

A gear 40 is keyed to the lower end of the shaft 36 and a mating gear 41 is mounted beside it on a shaft 42. The well 38 is conformed to the opposed sides of the gears so that they form a gear pump. A plate 43 which forms a horizontal continuation of a cylinder casting 44 is clamped by cap screws 45 to the top of the well 38 to complete the gear pump housing. A passageway 46 (Figs. 6 and 8) communicates between the bottom of the casing 30 and the intake or low pressure side of the gear pump so that the liquid medium is continually pumped from the supply held within the casing.

The cylinder 44 extends longitudinally of the casing 30 and is secured along the bottom of the casing by cap screws 45' as well as at the rear of the casing by the previously mentioned screws 45. The forward end of the cylinder 44 is closed by an integrally cast head 47 while the rear end is left open, terminating some distance from the rear wall of the casing. Within the casing is mounted a reciprocable piston 48 carrying at its forward end a floating cup leather 49. The piston 48 is itself cup-shaped, facing rearwardly for the reception of the forward end of a heavy compression spring 50. The rear end of the spring 50 is carried in a dished plug 51 threaded into a suitable opening in the rear wall of the casing. The back side of the plug 51 has a centering depression 52 in a hexagonal protuberance 53, so that in assembling, a gear puller may be employed to pull the plug 51 up to the rear wall where a wrench may be used to thread it in place—thereby placing a strong initial tension on the compression spring 50. The cylinder head 47 carries a suitable stop 54 for contacting the piston to prevent damage to the cup leather when the piston is in its innermost position.

The cylinder casting is ribbed along the lower edge of one of its sides to provide a sufficient stock for a longitudinal bore 55 which extends parallel with the cylinder and across the top of the integral plate 43. An outlet opening 56 extends through the plate from the high pressure side of the gear pump and communicates with the bore 55. A passageway 57 leads through the wall of the cylinder to connect the forward end of the bore 55 with the interior of the cylinder adjacent the head 47. Whenever the automobile is in motion the drive shaft will of course be rotating and the gear pump therefore operating. The liquid medium will be pumped from the bottom of the casing 30 through the intake passage 46, the outlet 56, the bore 55 and the passageway 57 into the cylinder forwardly of the piston to build up pressure therein and force the piston outwardly against the compression of the heavy spring 50.

In order to prevent breakage by filling the cylinder with more than its capacity of liquid and in order to relieve the gear pump of its load as quickly as possible, I provide a rotary valve 58 horizontally journaled transversely of the bore 55 and controlled by a snap-over mechanism. When the valve 58 is in the position shown in the drawings, all of the liquid pumped by the gear pump is confined to passage through the bore 55 into the cylinder. As presently described, when the cylinder 44 has been filled with the liquid medium under pressure and the piston 48 forced backwardly to a predetermined point, the valve 58 is snapped counterclockwise through 90° to its alternate position where communication with the bore 55 is closed and all of the liquid pumped by the gear pump is passed through a relief discharge opening 59 which is, in fact, merely a rearward continuation of the bore 55 and leads to the liquid supply in the casing 30. At such time the gear pump has substantially no load other than the incidental friction of the liquid medium. This liquid medium, it might be here explained, is preferably a mixture comprising half alcohol and half castor oil as more fully disclosed in my copending application, Serial No. 689,815, filed January 31, 1924, as this mixture does not congeal to any appreciable extent in cold weather and the ingredients do not tend to separate.

A ball check valve 60 is inserted in the bore 55 to prevent retrogression of the liquid under compression in the cylinder which might otherwise occur around the valve 58 when, for example, the cylinder has been pumped up to its capacity and the automobile left standing.

That trunnion of the valve 58 which extends toward the center of the cylinder 44 carries a V-shaped arm 61, the legs of which carry rollers 62 and 63 respectively, disposed in the same vertical plane. A rod 64 is pivoted on the arm 61 by the pivot pin of the roller 62 and extends upwardly through a socket shaped aperture 65 in a bracket 66 extending rearwardly from the upper wall of the cylinder casting 44. The rod 64 carries a semispherical washer 67 co-operating with the socket shaped aperture 65 slidably to pivot the upper end of the rod. A compression spring 68 is interposed between the washer 67 and the arm 61 to complete the snap-over mechanism and hold the valve in its alternate positions on either side of a dead center between the opening 65 and the axis of the valve 58. The valve is stopped in its clockwise rotation by the lug 69 on the valve arm positioned to contact the plate 43 which extends from the cylinder casting and forms the cover for the gear pump housing, and in its counterclockwise rotation by the roller 63 which likewise contacts the plate 43.

The piston 48 has a wide groove 70 adjacent its open end leaving a marginal bead 71. The roller 62 is in alignment with a vertical tangent to the bead 71 so that when the liquid medium is pumped into the cylinder and the piston forced backwardly against the force of the spring 50, the rearward face of the bead 71 engages the roller 62, swinging the valve until the roller has passed its dead center relation when the spring 68 will snap the valve through the rest of its movement to its alternate position where the gear pump pumps the liquid directly into the casing. My purpose in employing a bead 71 rather than a lug to engage the snap-over mechanism is that it avoids the necessity of any means for preventing rotation of the piston. In my compressor the piston is free to rotate if the flexing of the compression spring 50 tends to turn it.

When the valve is in this position the lower roller 63 has been swung upwardly and lies adjacent the forward face of the bead 71 and in alignment therewith. When the volume of liquid in the cylinder decreases, either by the opening of the control valve to admit liquid to the brakes or by a slow leakage through any of the valves the piston will move forwardly and the bead 71 engage the roller 63 rotating the valve counterclockwise (Fig. 4) until the roller 62 has again been brought past its dead center relation, whereupon the spring 68 will snap the valve counterclockwise a sufficient distance to shut off the by-pass or relief discharge opening 59 and open communication through the bore 55.

If the brakes are further applied and the piston continues to move inwardly, the spring 68 will hold the roller 62 against the rear face of the bead 71 to follow it forwardly while the roller 63 is freed from the forward face of the bead and rides downwardly and out of alignment with the path of the bead. The roller 63 will then contact the plate 43 and stop further forward movement of the roller 62 but the bead 71 will be free to travel forwardly as the roller 63 is then out of its path. The piston may therefore if necessary travel its full distance forwardly as shown in Figure 4, but when the cylinder is again pumped up and the piston moved backwardly, the bead 71 will pass the roller 63 and contact the roller 62 to shut off communication to the bore 55 when the predetermined volume of liquid has been pumped into the cylinder.

The control valve which regulates the pressure of the liquid medium applied to the wheel brakes is mounted in the integral cylinder head 47 at the forward end of the cylinder casting 44. A vertical bore 72 in the cylinder head has annular relief and intake grooves 73 and 74 respectively, the latter being in direct communication with the interior of the cylinder through an inlet opening 74'. The upper groove 73 communicates with the atmospheric pressure in the casing through a relief duct 73'. A valve piston 75 is slidably mounted in the bore 72 and is provided intermediate its ends with peripheral slots 76 communicating with the lower end of the bore 72. A web extends across the valve piston 75 above the slots 76 to close communication with the bore above the piston. Cross and vertical discharge ducts 77 in the cylinder head lead from the bottom of the bore 72 through the cover plate 37 to the previously mentioned T-fitting 16 for the tubing 15 which leads to the wheel brakes.

A light compression spring 78 in the bottom of the bore 72 urges the valve 75 upwardly to its normal position against the lower end of a guide bushing 79 threaded into the open upper end of the bore 72. A pedal rod 80 is slidably journaled in the bushing 79, a relatively heavy compression spring 81 being interposed between its lower end and the web of the valve piston 75. The pedal rod 80 extends upwardly through the floor board of the automobile and occupies a position preferably near the accelerator pedal and where the brake pedal is now generally located. A small passageway 82 preferably leads from the relief groove 73 to the bore 72 above the valve piston 75 so that pressure cannot build up therein to increase the pressure of the spring 81.

Let us assume that the compressor is in its normal position, that is, that the cylinder has been pumped to its maximum capacity. If the driver depresses the pedal rod 80 with a force of for example, eight pounds, the spring 81 will force the piston valve 75 downwardly against the tension of the light spring 78 which, let us say, has a pressure of a half pound. The valve 75 would therefore have an effective downward force of seven and a half pounds. The piston valve will therefore be moved down to the bottom of the bore 72 and the slots 76 moved out of registry with the relief groove 73 and into registry with the intake groove 74. The liquid under pressure in the cylinder will then flow through the inlet groove 74, the lower part of the bore 72, the discharge ducts 77 and tubing 15 to the several cylinders 20 at the wheel brakes. It will be understood that the tubing 15 and other portions of the brake line as well as the space in the cylinders 20 between the pistons are at all times full of the liquid medium and therefore it is only necessary to introduce the volume of liquid represented by the displacement of the pistons 21. When enough liquid has been passed through the control valve to build up a back pressure sufficient to counterbalance the seven and a half pounds pressure on the valve piston 75 the latter will be forced upwardly to its intermediate position where it closes communication with the intake groove 74. Should the driver then press the pedal rod 80 a little harder, the valve piston 75 will be moved downwardly to admit more liquid to the brakes until pressure was increased to counterbalance the increased pressure on the pedal rod. The valve piston 75 would thereupon again find a balance in shutting off communication with the inlet groove 74.

If the driver lessens the pressure of the pedal rod 80 the back pressure in the brake side of the valve will move the valve piston to its upper position where its slots 76 register with the relief groove 73. Some of the liquid medium will flow from the tubing 15 through the discharge duct 77, slots 76, relief groove 73 and the relief ducts 73' into the interior of the casing 30, until the lessened pressure below the valve piston is just over-balanced by the pressure on the pedal rod 80. The piston will then strike a balance to maintain the lessened pressure on the brakes. If the driver removes his foot entirely from the pedal rod 80 the light spring 78 will move the valve piston 75 to its upper position and allow the pressure on the brakes to be relieved through the relief duct 73'. The compression springs 28 on the wheel brakes of course return the pistons 21 to their inner positions and force the liquid medium, thus displaced, back into the casing 30.

The valve 58 tends to keep the reserve supply of liquid medium in the cylinder at its predetermined maximum capacity. Under ordinary operating conditions the piston will be in its rearward position and the valve 58 turned to pass the liquid directly from the gear pump to the interior of the casing. A forceful application of the brakes will take sufficient liquid from the cylinder to permit the piston 48 to move forwardly far enough to throw the valve to its load pumping position. After this is done the gear pump will be rotating fast enough to supply the necessary liquid medium to the brakes until the pressure required by the control valve has been built up, and the reserve held under pressure by the tension spring 50 need not be used. As soon as the demand of the control valve is less than the supply of liquid medium being delivered by the gear pump, the piston 48 will again be forced to its rearward position until the valve 58 snaps to the idling or non-load position for the pump.

When the automobile is at rest or moving very slowly and especially when on a slight hill, the gear cannot be relied upon to furnish the necessary braking power. It is under such conditions that the reserve held under pressure by the spring 50 becomes essential. The cylinder is preferably of a capacity holding enough reserve liquid under pressure to effect several successive forceful applications of the brakes.

The check valve 60 becomes especially necessary when the automobile is moving rearwardly and the valve 58 is set as shown in Figure 6 to communicate with the bore 55, or otherwise the gear pump might completely empty the cylinder. In braking a reverse movement of the automobile the reserve in the cylinder of course constitutes the sole braking power.

One feature of my invention which is particularly to be noted is that the driver, in applying the brakes, need not take into consideration the speed of the gear pump, for the brakes will be applied in proportion to the pressure he exerts on the pedal rod 80. It is also unnecessary for the driver to consider the distance through which he depresses the pedal rod, for the controlling factor is solely the pressure applied. The diameter of the bore 72 is preferably such that the pressure to be exerted on the pedal rod is but a minor fraction of the corresponding pressure built up in the brakes, but still a pressure which a driver can readily feel and thereby gauge the force being applied to the brakes.

The pressure exerted on the pedal rod 80 therefore effects a corresponding pressure on the brakes, and this proportional ratio continues to a certain pressure which is the maximum pressure in the cylinder. After this point has been reached an increased pressure on the pedal rod can of course result in no increase in the pressure applied to the brakes; it would, however, be only after numerous successive applications of the brake at very low speeds of the automobile that the maximum pressure obtainable in the brakes would be less than the highest pressure demanded by the control valve.

Another advantage to be observed is the simplicity of design and the facility of assembly of the compressor I have shown. Practically all of the moving parts which might need adjustment, inspection or repair,—the valve 58, associated snap-over mechanism and the control valve,—are mounted on the cylinder casting 44 which may be lifted out of the casing 30 by the removal of the cap screws 45. For ease in disassembling or removing the compressor, the pedal rod 80 is preferably jointed and the mating ends held together by a cotter pin 83.

While I have described this particular embodiment of my invention I do not consider my invention to be limited specifically thereto and contemplate that many changes may be made therein without departing from the spirit or scope of my invention.

What I claim is:

1. The combination with a motor vehicle, of a braking system therefor comprising a liquid-actuated brake mechanism for one of the wheels, a reservoir for liquid comprising a cylinder having a resiliently mounted piston for holding the liquid therein under pressure, means including a control valve connecting the reservoir and the brake mechanism; a pump, and means controlled by movement of the piston for delivering liquid under pressure from the pump to the reservoir.

2. A braking system for an automobile comprising, in combination, a wheel brake mechanism, a pump for supplying liquid under pressure thereto, a cylinder, a spring-pressed piston mounted therein, a valve for controlling the flow of liquid from the pump to the cylinder, said valve being controlled by movement of said piston, and passage means including a control valve for conducting fluid under pressure from the cylinder to the brake mechanism.

3. The combination with a motor vehicle, of a braking system therefor comprising wheel brakes, means forming a source of liquid medium under pressure comprising a reservoir, spring means for holding under pressure liquid forced into the reservoir, a compressor driven by the wheels for pumping the medium into the reservoir under pressure, and a valve between the compressor and the reservoir for automatically maintaining a predetermined amount of liquid under pressure in the reservoir.

4. The combination with a motor vehicle, of a braking system therefor comprising wheel brakes, means forming a source of liquid medium under pressure comprising a reservoir, spring means for holding under pressure liquid forced into the reservoir, a compressor driven by the wheels for pumping the medium into the reservoir under pressure, and a valve between the compressor and the reservoir for automatically maintaining the liquid in the reservoir above a predetermined pressure; means actuated by the liquid medium for actuating the wheel brakes; and a manually controlled valve for admitting the liquid medium under pressure from said first-mentioned means to said brake applying means.

5. The combination in a motor vehicle braking system, of wheel brakes, a reservoir, a compressor driven by the vehicle wheels for supplying liquid medium under pressure to the reservoir, spring means for holding said liquid medium under pressure, valve means between the compressor and the reservoir for automatically keeping the pressure in the reservoir within predetermined limits, and manually controlled means actuated by said liquid medium for applying said brakes.

6. The combination with a motor vehicle, of a braking system therefor comprising wheel brakes; means forming a source of liquid medium under pressure comprising a reservoir, spring means for holding under pressure liquid forced thereinto, and a compressor driven by the wheels for pumping the medium into the reservoir under pressure; means actuated by the liquid medium for applying the wheel brakes; and a manually controlled valve for admitting the liquid medium under pressure from said first-mentioned means to said brake applying means.

7. A braking system for a motor vehicle comprising wheel brakes actuated by liquid pressure, a cylinder having a resiliently mounted piston, means driven by the vehicle wheels for pumping up the piston with a liquid under pressure, control means for said pumping means for maintaining a predetermined amount of liquid under pressure in the cylinder, and passage means including a control valve for connecting the wheel brakes with the cylinder.

8. A "servo" brake mechanism comprising wheel brakes, a compressor driven by the wheels, a reservoir, a piston resiliently mounted therein, passage means including a control valve between the cylinder and the brakes, passage means including a valve between the compressor and the cylinder, and a snap-over mechanism for the latter valve actuated by the piston for maintaining the reservoir filled with liquid under pressure.

9. A "servo" brake mechanism comprising wheel brakes, a compressor driven by the wheels, a reservoir, a piston resiliently mounted therein, passage means including a control valve between the cylinder and the brakes, passage means including valve means constituting a check valve for leading liquid from the compressor to the reservoir, and means actuated by the piston for controlling the valve to maintain a body of liquid under pressure in the reservoir.

10. The combination with a "servo" braking system, of a source of liquid under pressure comprising a casing forming a liquid supply container, a gear pump housing formed in the bottom of the casing, a pair of rotary gears therein, a cylinder within the casing, passage means between the pump and the cylinder including a valve, a resilient spring for the piston, and a control mechanism for the valve actuated by the movement of the piston for maintaining a body of liquid under compression in the cylinder.

11. A liquid pressure supply device for a "servo" brake mechanism comprising a compressor, a cylinder having a resiliently mounted piston, passage means including a valve between the discharge side of the compressor and the cylinder, a snap-over mechanism for actuating the valve, and abutments on the piston for engaging the snap-over mechanism to actuate the valve for maintaining a body of liquid under compression in the cylinder, the abutments being annular whereby the snap-over mechanism will be actuated regardless of rotary movements of the piston within the cylinder.

12. A liquid pressure supply device for a fluid-actuated brake system comprising a compressor, piston and cylinder members mounted for relative rotary movement, passage means between the cylinder member and the discharge side of the compressor including a valve, a snap-over mechanism for the valve, and annular abutments on one of said members for engaging the snap-over mechanism to maintain a body of liquid under pressure in the cylinder member even though the member carrying the abutments rotates relatively to the snap-over mechanism.

13. A unitary liquid pressure supplying device for a "servo" brake mechanism comprising a casing within which is mounted an actuating liquid system comprising a cylinder, a compressor for supplying liquid thereto, a resiliently mounted piston in the cylinder, an outlet valve for the cylinder also within the casing, and an intake passage for the compressor in communication with the interior of the casing for carrying into the liquid system any liquid which escapes into the casing from any of the aforesaid elements of the system.

14. The combination with a "servo" brake mechanism, of a device for supplying liquid under pressure thereto comprising a casing having a gear pump housing formed in the bottom thereof, rotary gears for the gear pump, a cylinder communicating with the discharge side of the gear pump mounted within the casing and having a plate portion completing the gear pump housing, and a resiliently mounted piston in the cylinder for maintaining the liquid therein under pressure.

15. A device forming a source of liquid under pressure for a fluid-actuated brake system comprising a compressor, a casing, a cylinder mounted within the casing and in communication with the discharge side of the compressor, a piston in the cylinder, the cylinder having an open end facing toward one wall of the casing, a compression spring abutting the piston and extending toward said opposite wall, an opening in the wall opposite the open end of the cylinder for the insertion of the spring, and an abutment member for the outer end of the spring screw threaded into said opening for placing an initial tension on the spring.

16. The combination with a motor vehicle of a braking system therefor comprising wheel brakes, a casing for confining liquid, a reservoir submerged in the liquid of said casing for holding the liquid forced thereinto under pressure, a compressor for pumping the liquid from the casing into the reservoir under pressure, said compressor being disposed within said casing and submerged in the liquid therein, liquid pressure operated means for applying the brakes and a manually controlled valve for admitting the liquid under pressure from the reservoir to the brake applying means.

17. The combination with a motor vehicle of a braking system therefor, comprising wheel brakes, a casing for confining a liquid medium, a reservoir submerged in the liquid in said casing for holding liquid under pressure, a compressor for pumping liquid under pressure from the casing into the reservoir, automatic means including a mechanically actuated valve for maintaining the pressure in said reservoir substantially constant, liquid pressure actuated means for applying the brakes, a manually controlled valve for admitting the liquid under pressure from the reservoir to the brake applying means, and means associated with the valve for relieving back pressure from the brake applying means to the casing when the valve returns to its inoperative position.

In witness whereof, I hereunto subscribe my name this 27th day of December, 1924.

MALCOLM LOUGHEAD.